Jan. 29, 1952     D. S. MELLETT     2,584,083
GATE VALVE
Filed Feb. 22, 1945
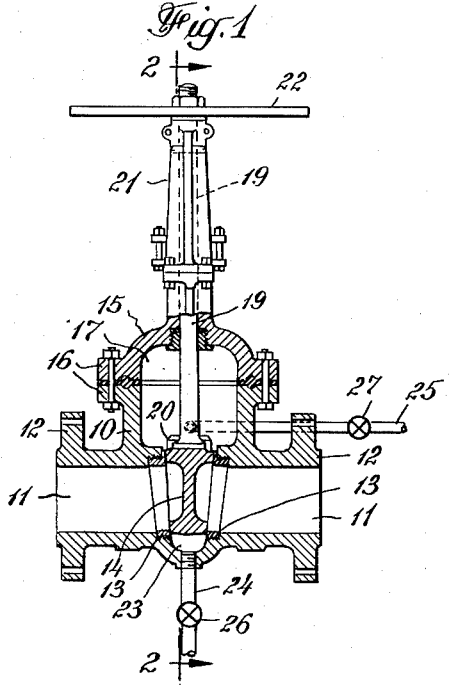
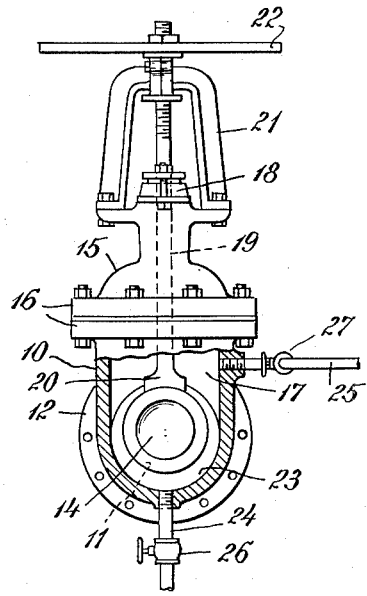
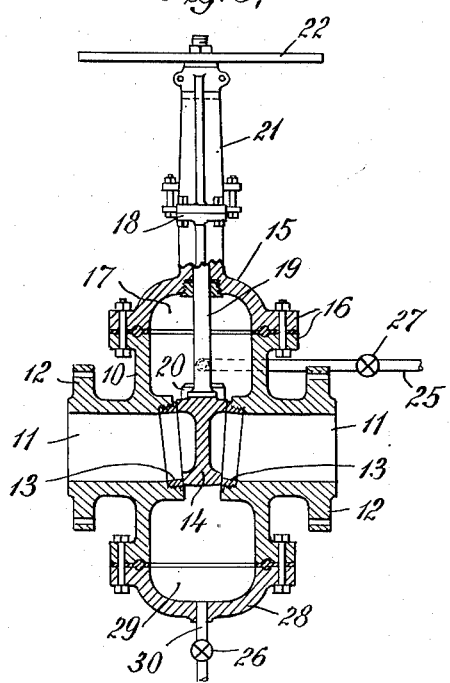
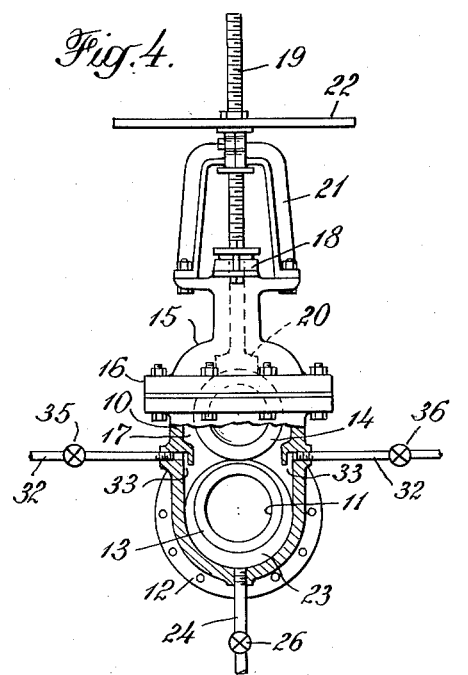
INVENTOR
DANA S. MELLETT
BY
John A. Crowley Jr.
ATTORNEY OR AGENT

UNITED STATES PATENT OFFICE 2,584,083

GATE VALVE

Dana S. Mellett, Dearborn, Mich., assignor to Socony-Vacuum Oil Company, Incorporated, New York, N. Y., a corporation of New York Application February 22, 1945, Serial No. 579,240

1 Claim. (Cl. 251—59)

This invention has to do with an improvement in ordinary gate valves of either the rising stem or non-rising stem variety. It has specifically to do with an improvement in gate valves for use in pipes handling fluids which may contain various quantities of sediment and solid particles which tend to settle out, especially during periods of no fluid flow or low rate fluid flow. Typical of such applications is the use of gate valves on the suction conduits from petroleum storage tanks in oil refineries.

It is well known that in ordinary gate valve construction an annular space or groove is provided around the periphery of the gate disk in the valve shut position between the edge of the gate disk and the body of the valve and confined by the spaced seat rings on either side. When gate valves are used on suction lines from storage tanks in refineries, low fluid flow rates through the valve and often no flow at all is the usual occurrence. Under such conditions, rust from the storage tank, grit, sand and other solid foreign matter accumulate in the annular space or groove provided in the valve and become packed therein by the repeated opening and closing of the valve. Eventually this accumulation of solid material becomes so great as to prevent proper seating of the valve. As a consequence, the valve must soon be removed from the suction pipe and dismantled, cleaned and probably refaced or replaced entirely by a new valve. As a result, the normal operating life of otherwise very desirable gate valves is greatly reduced, and the requirement of their frequent replacement often causes the expensive "shut down" of an entire process operation.

It is the object of this invention to provide a gate valve for service in such applications as above mentioned which valve is free of the above described difficulties.

A specific object of this invention is the provision of means to prevent the undue accumulation of solid foreign matter in the groove between the gate disk and valve body in gate valves.

These and other objects of this invention will become apparent from a study of the drawings attached hereto of which Figure I is a vertical view, partially in section of a gate valve improved according to this invention, Figure II is a vertical view partially in section taken on lines 2—2 of Figure I, Figure III is a vertical view of gate valve, partially in section, incorporating a modified form of this invention and Figure IV is a vertical view of a gate valve, partially in section incorporating a preferred form of this invention. All of these figures are diagrammatic in form.

Turning now to Figures I and II which may be read together, we find a valve body 10, having a passage for fluid flow 11 therethrough and carrying flanges 12 on either end. Removable seat rings 13 are properly spaced and positioned across the valve body and a disk 14 is provided to fit snugly between the seat rings 13 so as to stop fluid flow therethrough. A valve bonnet 15 is attached by flanges 16 to the valve body so as to provide a disk-receiving chamber 17 of sufficient size to receive the disk 14 when raised into the valve open position. A stuffing box 18 is provided in the upper section of the valve bonnet and a valve stem 19 extends longitudinally through the valve bonnet 15 and is connected to the disk 14 by a slotted type connection 20 which permits rotation of the valve stem when the valve is of non-rising stem variety. The valve stem works through yoke 21 and wheel 22 so as to be easily raised or lowered by rotation of wheel 22. It will be noted that an annular space or groove 23 is provided between the edge of the disk 14 when in a valve closed position and the valve body 10. A drain pipe 24 is connected through the bottom of the valve body so as to permit withdrawal of material from the annular space 23. The provision of this drain pipe is alone insufficient to insure removal of solid sediment which may become packed by the seating of the disk 14. Consequently, a fluid inlet conduit 25 is connected through the valve body into the chamber 17. It will be noted that when the disk 14 is in the valve shut position, chamber 17 is in free communication only with the annular space 23. Thus when the disk is in the valve shut position, flushing fluid may be admitted through conduit 25 and thence through chamber 17 into annular space 23 to dislodge and carry solid sediment therefrom through the drain pipe 24. When the sediment has been removed, valves 26 and 27 on conduits 24 and 25 respectively may be closed and the disk 14 raised to permit continuation of fluid flow through the valve. As a flushing fluid water or any other suitable fluid such as that handled by the pipe in which the valve is located may be used. A separate pump may be provided for introduction of the flushing fluid into chamber 17. In some cases the flushing fluid may be obtained from the high pressure side of the pump on the pipe on which the valve in question is functioning as a suction valve.

Turning now to Figure III, we find a gate valve which is in most respects similar to that shown in Figure I and like parts bear like numerals. The arrangement in Figure III differs from that in Figure I, in that the bottom of the valve body 10 is extended downwardly to form with flanged closure plate 28 a chamber 29 below and in free communication only with the annular space 23 in the gate valve. A drain pipe 30 is provided on the bottom of the chamber 29. This arrangement permits the settling of solid sediment into chamber 29 during periods of fluid flow, thereby avoiding the tendency for such material to be packed in the annular space 23 upon seating of the disk 14. A flushing fluid inlet conduit 25 is again provided into chamber 17.

Turning to Figure IV, we find a valve similar to that shown in Figure I and bearing like numerals on like parts except that two inlet connections 31 and 32 having valves 35 and 36 respectively thereon are provided into chamber 17 at locations just over the annular space 23. Moreover, baffles 33 are provided within the chamber 17 just opposite the inlet connections 31 and 32 which baffles are such as will cause the entering flushing fluid to be directed as jets directly into the annular space 23 so as to more readily agitate by high fluid velocity any settled solid material out of the annular space 23. The flushing oil inlet connections may be used in conjunction with the drain connection 24 when the disk 14 is in the valve shut position as described hereinabove, or alternately, flushing fluid may be introduced while the disk 14 is in the valve open position to help prevent the settling of solid material in the annular space 23 during fluid flow through the valve. In the latter case the flushing fluid should be one which will not contaminate the fluid flowing through the pipe on which the valve is provided.

In all of the above examples the valve shown is of a rising stem variety but the invention may be used equally well with the non-rising stem type of gate valve. It will be understood that the particular valve construction and the type of and exact flushing fluid inlet and outlet connections shown hereinabove are merely exemplary in character and are in no way intended as limiting the scope of this invention except as it may be limited by the following claim.

I claim:

An improved gate valve which comprises in combination: a valve body, a pair of seat rings suitably arranged and spaced across said body, a movable disk adapted to fit snugly between said rings so as to shut off fluid flow therethrough, said disk being of such size as to provide an annular space around its periphery between its outer edge and said valve body, the lowermost portion of said disk terminating within the outer periphery of said seat rings when the disk is in closed position, said seat rings being so mounted across said body that said annular space is limited in width to the width of said disk, the planes of the faces of said seat rings being tangent to that innermost portion of the valve body which together with the disk forms the annular space and into which the seat rings are mounted, a valve bonnet connected into the top of said valve body so as to provide a disk receiving chamber for said disk when disengaged from said seat rings, said disk receiving chamber communicating therebelow, when said disk is in the valve closed position only with said annular space, and a stuffing box within the upper portion of said bonnet, a valve stem extending longitudinally through said bonnet and associated with said disk to provide movement thereof between valve open and valve closed position, a drain pipe connected to the approximate bottom of said valve body and in free communication with only said annular space, a valve on said drain pipe, fluid inlet connections on said valve body on opposite sides of said disk receiving chamber and opening directly over said annular space, a shield attached to the inside of said valve body opposite each of said inlet connections, said shields surrounding the opening of each of said inlet connections except below whereby fluid entering from said inlet connections may be jetted directly into said annular space on opposite sides thereof and means to introduce flushing fluid through said inlet connections.

DANA S. MELLETT.

REFERENCES CITED

The following references are of record in the file of this patent:

UNITED STATES PATENTS

| Number | Name | Date |
|---|---|---|
| 1,726,092 | Wilputte | Aug. 27, 1929 |
| 2,031,151 | Eulberg | Feb. 18, 1936 |
| 2,200,310 | Thayer | May 14, 1940 |
| 2,253,888 | Carlson | Aug. 26, 1941 |

FOREIGN PATENTS

| Number | Country | Date |
|---|---|---|
| 541,695 | Germany | Jan. 14, 1932 |